Patented Nov. 2, 1926.

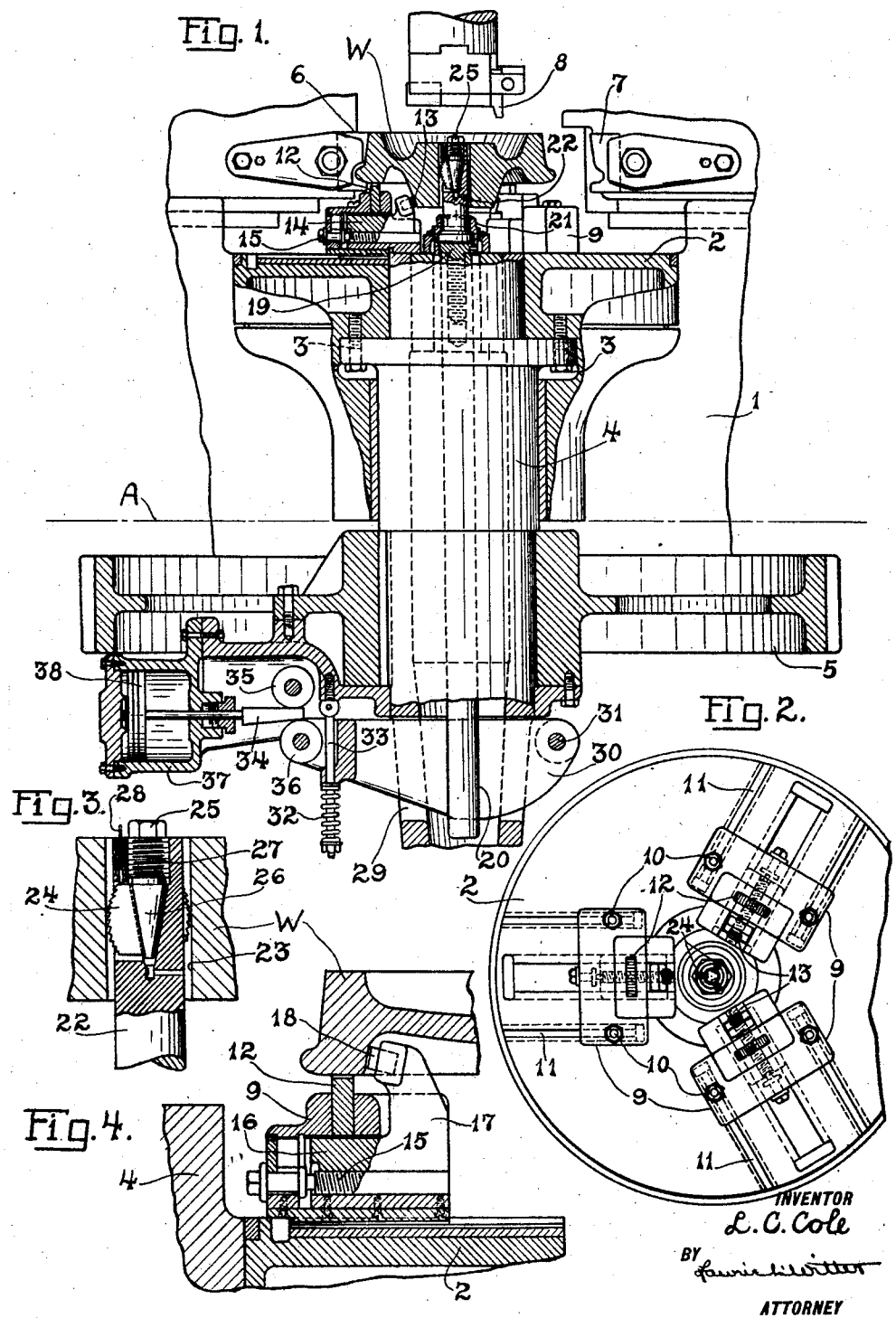

1,605,173

UNITED STATES PATENT OFFICE.

LYNDON C. COLE, OF HAMILTON, OHIO, ASSIGNOR TO NILES-BEMENT-POND COMPANY, OF NEW YORK, N. Y., A CORPORATION OF NEW JERSEY.

WORK-HOLDING MEANS FOR CAR-WHEEL LATHES.

Application filed December 7, 1923. Serial No. 679,158.

This invention relates to work holding and driving mechanism and particularly to such mechanism as is illustrated in Patents No. 1,549,451 and 1,549,452 granted August 11, 1925, of which the construction shown herein forms a modification and improvement.

The machine illustrated in the said patents is a car wheel lathe particularly adapted to operate on rolled steel car wheels to perform both the rough cutting and finishing operations thereon. These cutting operations are extremely heavy and require a very rugged holding and driving mechanism for the car wheel. In the said patents, there are shown three work driving and holding members mounted on the rotary work table, each member including a serrated driving jaw or dog for engaging against the adjacent face of the wheel and a hook-shaped holding jaw for engaging the inner surface of the rim of the wheel. The hook-shaped jaws hold the wheel secured against lateral movement on the table and the serrated driving jaws operate to rotate the wheel with the table, the wheel being held down against the serrated jaws by an improved holding-down means extending axially through the table supporting spindle.

Small car wheels must be prevented from lateral movement on the table by means other than the said hook-shaped jaws since the space in such wheels is insufficient to receive such jaws. As illustrated in the accompanying drawing, I provide jaws in the work holding and driving members for gripping these smaller wheels at the hub, such jaws cooperate with the members to prevent lateral sliding of the work in the same manner as do the hook-shaped jaws. These hub-engaging jaws and the hook-shaped rim-engaging jaws are constructed to be interchangeably mounted in the said work holding and driving members. The primary object of the invention is to provide an improved and preferably interchangeable work holding and driving member of the type defined.

Another object of the invention is to provide a novel work engaging means for holding the work down on the table and in engagement with the work driving jaws.

With the above and other objects in view, my invention consists in the features of construction and operation set forth in the following specification and illustrated in the accompanying drawing. In such drawing annexed hereto and forming a part of this specification, I have shown certain embodiments of my invention in a vertical car wheel lathe but it will be understood that the invention can be otherwise embodied and that the drawing is not to be construed as defining or limiting the scope of the invention, the claims appended to this specification being relied upon for that purpose.

Referring to the figures of the drawing:

Figure 1 is a fragmentary vertical sectional view through a car wheel lathe work table and its operating mechanism.

Fig. 2 is a plan view of the work table.

Fig. 3 is an enlarged fragmentary sectional view of a detail.

Fig. 4 is an enlarged fragmentary view showing a modified form of the invention.

Referring to the drawing, 1 indicates the bed of the machine having a work table 2 rotatably mounted thereon. Bolts 3 secure the work table to the upper end of a spindle 4 rotatably mounted in the bed 1. The table is adapted to be rotated from a large gear 5 secured to the spindle below the floor line A. The car wheel W is adapted to be operated on by tools 6, 7 and 8 in the manner described in the first of the above mentioned patents.

The work table 2 is illustrated as provided with three work holding and driving members 9 each adjustably secured to the table by two bolts 10 engaging in T-slots 11. An upwardly extending serrated work driving jaw or dog 12 is mounted in each member 9, which member is also adapted to receive a work holding jaw as hereinafter described. In Fig. 1 I have illustrated a work holding jaw 13 on the forward end of a slide 14 in the member 9. A screw 15 is provided in connection with each slide to move the same to engage the jaws 13 with the hub of the car wheel W.

When operating on relatively large car wheels, as shown in Fig. 4 of the drawing and in the patents, it is preferable to use work holding jaws of the type shown in Fig. 4. Each of these jaws comprises a slide 16 having an upwardly extending hook-shaped projection 17 supporting a work engaging jaw 18 therein. This jaw 18 is adapted to engage the inner surface of the rim of the car wheel. The slide portions of the members 14 and 16 are of a like construction whereby both can be interchangeably mounted in the members 9. Small car wheels as shown in Fig. 1 are necessarily gripped at the hub since the inner space at the rim is insufficient to receive the hook-shaped jaws (Fig. 4) therein.

After the work has been properly centered on the table, the same must be held down vertically in contact with the driving jaws 12. A stud 19 is screw-threaded into the upper end of a rod 20 extending downwardly into the spindle 4. A bushing 21 extends over a flange on the lower end of a stud 22 and is threaded to the stud 19. The stud 22 is thereby swivelly connected to the stud 19 and is adapted to extend into the bore 23 of a car wheel mounted on the table.

The stud 22 is slotted to receive three serrated work engaging jaws 24 therein. A plug 25 has a conical portion 26 engaging the jaws 24 and a portion 27 screw-threaded into the stud. Rotation of the plug to move the conical portion inwardly is adapted to force the jaws radially outward into engagement with the work. The jaws are frictionally held in place between spring pressed plungers 28 and the bottoms of the slots.

Within a slotted portion 29 of the spindle is mounted an arm 30 pivoted on the spindle at 31. The free end of the arm is normally held in a raised position by means of a spring 32 on a stud 33. The arm may be forced downwardly against the action of the spring by means of a wedge 34 operating between rollers 35 and 36 secured to the spindle and arm respectively. Fluid pressure means as the cylinder 37 and piston 38 is preferably provided for operating the wedge. It will be noted that the cylinder and other parts in connection therewith are secured to the spindle driving gear 5.

The operation of initially gripping a car wheel is as follows: The plug 25 is screwed inwardly sufficiently to force the jaws 24 outwardly just enough to engage with the work. Upon downward movement of the rod 20 thereafter, the jaws 24 will slide up the conical portion 26 and thereby be forced outwardly into biting engagement with the wall of the bore 23.

What I claim is:

1. A work holding and driving member comprising in combination, a block adapted to be mounted on a rotary work table, a serrated work driving jaw mounted on the block, a work holding jaw movably mounted in the block, and screw threaded means for moving the holding jaw into engagement with the work on the table, the driving jaw being adapted to bite the surface of the work facing the stable and the holding jaw being adapted to engage a relatively angular surface thereof to hold the work against lateral movement.

2. A work holding and driving member comprising in combination, a block adapted to be mounted on a rotary work table, a serrated work driving jaw mounted on the block, a work holding jaw slidably mounted in the block, and screw threaded means for sliding the holding jaw radially of the table into engagement with the work thereon, the driving jaw being adapted to bite the surface of the work facing the table and the holding jaw being adapted to engage a relatively angular surface thereof to hold the work against lateral movement.

3. A work holding and driving member comprising in combination, a block adapted to be mounted on a rotary work table, a serrated work driving jaw mounted on the block, a work holding jaw slidable in the block relative to the driving jaw, and screw threaded means for sliding the holding jaw radially of the table into engagement with the work thereon, the driving jaw being adapted to bite the surface of the work facing the table and the holding jaw being adapted to engage a relatively angular surface thereof to hold the work against lateral movement.

4. A work holding and driving member comprising in combination, a block adapted to be mounted on a rotary work table, a serrated work driving jaw mounted on the block, a slide in the block having a forwardly projecting work holding jaw on its forward end, and means for moving the slide inwardly of the table and block to engage the holding jaw against the work, the driving jaw being adapted to bite the surface of the work facing the table and the holding jaw being adapted to engage a relatively angular surface thereof to hold the work against lateral movement.

5. A work holding and driving member comprising in combination, a block adapted to be mounted on a rotary work table, a serrated work driving jaw mounted on the block, a pair of slides respectively provided with a radially inwardly extending work engaging jaw and a radially outwardly extending work engaging jaw, the block being adapted to receive either slide therein, and means in the block for moving either slide to engage its jaw with the work on the table, the driving jaw being adapted to bite the surface of the work facing the table and the holding jaw being adapted to engage a relatively angular surface thereof to hold the work against lateral movement.

6. A work holding and driving member for a car wheel lathe comprising in combination, a block adapted to be mounted on a rotary work table, a serrated work driving jaw mounted on the block, a pair of slides, one slide having a radially inwardly extending jaw adapted to engage the hub of a car wheel on the table and the other slide having a radially outwardly extending jaw adapted to engage the inner surface of the rim of a car wheel on the table, the block being adapted to receive either slide therein, and a screw in the block adapted to engage either slide and to move the same to engage its jaw with the wheel on the table, the driving jaw being adapted to bite the surface of the wheel facing the table and the holding jaw being adapted to engage a relatively angular surface thereof to hold the wheel against lateral movement.

7. In combination with a rotary work support and driving dogs thereon, of an element extending axially within the work support, the outer free end of the element being adapted to extend into the bore of a work piece, a plurality of serrated work-engaging jaws in the said end of the element, means for positively forcing the jaws outwardly into engagement with the work, and means for drawing the element into the support whereby to hold the work piece in contact with the driving dogs.

8. In combination with a rotary work support and driving dogs thereon, of an element extending axially within the work support, the outer free end of the element being adapted to extend into the bore of a work piece, a plurality of serrated radially-extending work-engaging jaws in the member, screw threaded means for positively forcing the jaws radially outward into engagement with the work, and means for drawing the element into the support whereby to hold the work piece in contact with the driving dogs.

9. In combination with a rotary work support and driving dogs thereon, of an element extending axially within the work support, the outer free end of the element being adapted to extend into the bore of a work piece, a plurality of serrated work-engaging jaws in the member, a tapered plug operative against the jaws to positively force the same outwardly into engagement with the work, and means for drawing the element into the support whereby to hold the work piece in contact with the driving dogs.

In testimony whereof, I hereto affix my signature.

LYNDON C. COLE.